June 2, 1964    F. HAUPTMAN    3,135,119
MULTI-UNIT TACHOMETER
Filed Aug. 3, 1961
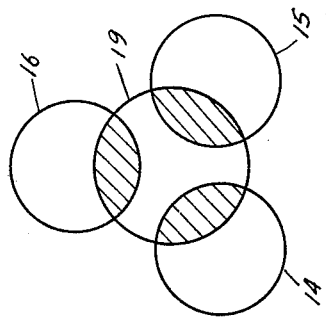
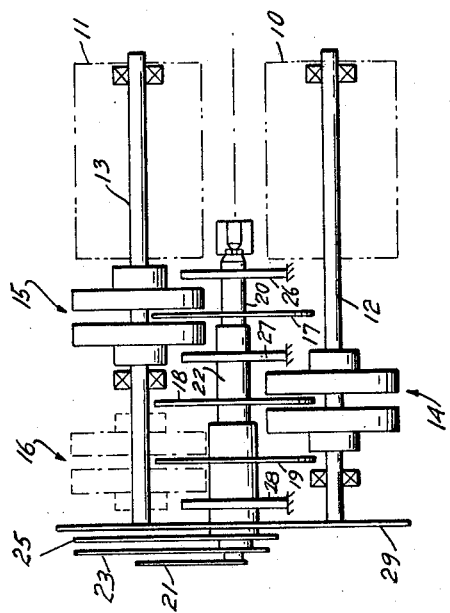
INVENTOR.
FREDERIC HAUPTMAN
BY
OSTROLENK, FABER, GERB & SOFFEN
ATTORNEYS

United States Patent Office 3,135,119
Patented June 2, 1964

3,135,119
MULTI-UNIT TACHOMETER
Frederic Hauptman, Forest Hills, N.Y., assignor to Kollsman Instrument Corporation, Elmhurst, N.Y., a corporation of New York
Filed Aug. 3, 1961, Ser. No. 129,004
4 Claims. (Cl. 73—519)

This invention relates to a novel multi-unit tachometer which has concentric pointers each driven by an off-center magnetic assembly which drives respective discs on concentric multi-pointer shafts.

A primary object of this invention is to provide a novel multi-unit tachometer for operation with relatively vibration free environments.

Another object of this invention is to provide a novel tachometer for simultaneously presenting the speed of a plurality of rotating elements such as aircraft engines without requiring a source of vibration to overcome friction within the tachometer mechanism.

A further object of this invention is to provide a novel tachometer arrangement which avoids the friction introduced due to gear trains.

These and other objects of the invention shall be readily apparent after reading the following description of the accompanying drawings, in which:

FIGURE 1 schematically illustrates a side view of an embodiment of an invention.

FIGURE 2 is a side view of FIGURE 1 and schematically illustrates the off-center position of the magnetic assemblies of the various tachometer elements.

In the past and where presentation of the revolutions per minute of several engines or a combination of rotor turbine and compressor shafts is necessary, it has been the practice to place several tachometer mechanisms inside a common case and to gear the output shafts to a corresponding number of concentric pointers. It is necessary with such an arrangement to have a certain amount of vibration to overcome unavoidable friction due to the gear trains. The system works well with the typical aircraft using reciprocating engines which supply sufficient panel vibration for this purpose. When, however, the device is used with jet engines, the vibration is diminished and, in some cases, it is necessary to supply a special vibrator for the device.

In accordance with the present invention, the gear train concept is avoided and the several tachometers are connected to respective pointers through an eddy-current drive system.

Referring to the FIGURES 1 and 2, a triple tachometer structure is indicated where three independent inputs corresponding, for example, to motors 10, 11 and a third motor behind motor 11 which cannot be seen, have respective output shafts 12, 13 and the output shaft of the motor not seen. Each of these output shafts is then connected to a mated pair of magnetic assemblies which are secured to the output shafts of their respective motor. Thus, output shaft 12 drives magnet assembly 14; output shaft 13 drives magnet assembly 15, while the motor not seen in FIGURE 1 drives magnet assembly 16.

It will be noted that these magnet assemblies 14, 15 and 16 are arranged at the corners of a triangle as best illustrated in FIGURE 2. The magnet assemblies 14, 15 and 16, which are preferably formed of permanent magnet structures, each receive a portion of a respective disc of some suitable material which will thereby be partially imbedded in the magnetic field created by its respective magnet assembly. Thus, magnet assembly 15 partially receives disc 17; magnet assembly 14 partially receives disc 18; and magnet assembly 16 partially receives disc 19.

The discs 17, 18 and 19 are identical to one another and are concentric with one another, each of the discs being mounted on telescoping shafts. Thus, disc 17 is mounted on rotatable shaft 20 which extends outwardly to a pointer 21; disc 18 is mounted on shaft 22 which is rotatable with respect to shaft 20 and extends outwardly to pointer 23; and disc 19 is mounted on shaft 24 which is rotatable with respect to the other concentric shafts and terminates on pointer 25. Each of telescoping shafts 20, 22 and 24 are additionally provided with calibrating springs schematically illustrated by retaining springs 26, 27 and 28 respectively.

In operation, it will be apparent that the discs 17, 18 and 19 will be positioned against the force of their respective retaining springs 26, 27 and 28 in accordance with the speed and direction of rotation of the driving tachometer motors. Thus, the pointers 21, 23 and 25 will be appropriately positioned with respect to indicating disc 29 so that a simultaneous presentation of the parameters measured by the three tachometer motors is available.

It will also be noted that the discs of the off-center drive system could be custom-shaped to meet the requirements of a non-linear dial specification.

Although preferred embodiments of this novel invention are described herein, many variations and modifications of the principles of the invention within the scope of the description herein are obvious. Accordingly, it is preferred that this invention be bound not by the specific disclosure herein but only by the appended claims.

I claim:

1. A multi-unit tachometer comprising at least a first and second input shaft, a first and second output shaft, and first and second coupling means for respectively coupling said first and second input shafts to said first and second output shafts; said first and second output shafts being concentric with respect to one another; said first and second input shafts being spaced from one another; said first and second coupling means each comprising a magnetic member generating a magnetic field in an annular air gap and a respective disc moveable in the magnetic field generated by said magnetic member in said air gap; said disc being in a plane parallel to the plane of said annular air gap and extending partially into said annular air gap; said magnetic members of said first and second coupling means being connected to one of said first and second input or said first and second output shafts respectively; said discs of said first and second couplings being connected to the other of said first and second input shafts or said first and second output shafts respectively; said first and second discs being longitudinally displaced with respect to one another.

2. The device substantially as set forth in claim 1 wherein each of said first and second output shafts terminates in respective concentric pointers.

3. The device substantially as set forth in claim 1 wherein a plurality of input shafts are respectively connected to a plurality of output shafts through a respective plurality of coupling means.

4. The device substantially as set forth in claim 1 wherein said first disc is shaped in area to give a predetermined non-linear output rotation.

References Cited in the file of this patent

UNITED STATES PATENTS

| 1,377,963 | Horvath | May 10, 1921 |
|---|---|---|
| 2,112,704 | Mackay | Mar. 29, 1938 |
| 2,371,511 | Faus | Mar. 13, 1945 |
| 2,593,646 | Andresen | Apr. 22, 1952 |

FOREIGN PATENTS

| 565,108 | Great Britain | Oct. 26, 1944 |
|---|---|---|
| 835,040 | Great Britain | May 18, 1960 |